United States Patent [19]
Clark et al.

[11] Patent Number: 5,081,942
[45] Date of Patent: Jan. 21, 1992

[54] DEPTH ADJUSTING DEVICE FOR A FURROW OPENER

[75] Inventors: Richard H. Clark, Urbandale; John D. Long, Ankeny, both of Iowa

[73] Assignee: Deere & Company, Moline, Ill.

[21] Appl. No.: 607,014

[22] Filed: Oct. 30, 1990

[51] Int. Cl.⁵ .............................................. A01C 5/06
[52] U.S. Cl. ..................................... 111/136; 111/926
[58] Field of Search ............................... 111/134–137, 111/69, 926

[56] References Cited

U.S. PATENT DOCUMENTS

| | | | |
|---|---|---|---|
| 1,099,337 | 6/1914 | Buchanan | 111/136 X |
| 3,626,877 | 12/1971 | Hansen et al. | 111/136 X |
| 4,307,674 | 12/1981 | Jennings et al. | 111/136 X |
| 4,374,500 | 2/1983 | Westerfield | 111/137 X |
| 4,398,478 | 8/1983 | Frase et al. | 111/137 X |
| 4,413,685 | 11/1983 | Gremelspacher et al. | 111/926 X |
| 4,712,492 | 12/1987 | Murray | 111/136 |

FOREIGN PATENT DOCUMENTS

| | | | |
|---|---|---|---|
| 0547450 | 11/1959 | Belgium | 111/134 |
| 2921183 | 12/1979 | Fed. Rep. of Germany | 111/135 |

OTHER PUBLICATIONS pp. 23, 73, 76, 86 and 113 of the John Deere 7100 Mounted Max-Emerge Planters Operator's Manual OM-A33814 (May 1982).

pp. 65-9 and 65-10 of the John Deere 7200 Flex-Fold Drawn Planters Operator's Manual OM-H135741 (Dec. 1987).

Primary Examiner—Randolph A. Reese
Assistant Examiner—Jeffrey L. Thompson

[57] ABSTRACT

A depth gauging adjustment mechanism includes a spring-loaded handle which pivots about a common axis with the depth gauging wheel arm on an opener assembly. The handle has two transversely located pins, and the back of the opener assembly has notches on a radius struck on the axis for receiving the pins. The wheel arm and thus the planting depth are maintained by the handle. Each handle position represents a different planting depth which can be adjusted easily with one hand by pulling the handle against the bias, repositioning the pins and then releasing the handle. The wheel arm is freely rockable downwardly from the depth adjusted position to facilitate handle movement when the opener assembly is raised from the ground-working position.

8 Claims, 2 Drawing Sheets

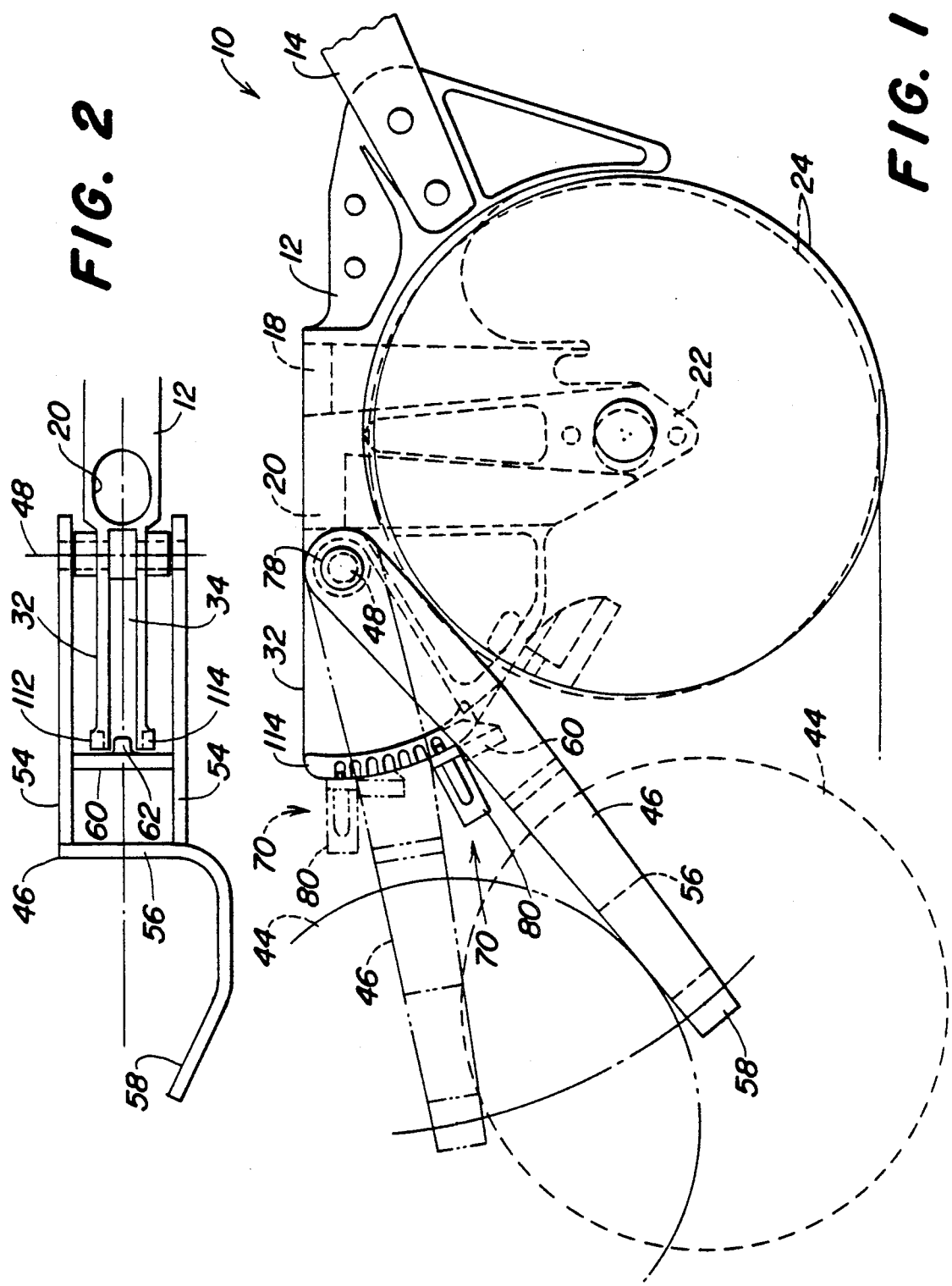

DEPTH ADJUSTING DEVICE FOR A FURROW OPENER

BACKGROUND OF THE INVENTION

1) Field of the Invention

The present invention relates generally to agricultural planting equipment, and more specifically to depth gauging systems on grain drill opener assemblies and the like.

2) Related Art

Grain drill opener assemblies typically include a furrow opener for opening the soil and depositing seed in a furrow, and a trailing press wheel for firming the soil around the seed and maintaining the proper opener depth. A press wheel arm includes a forward end pivotally connected to the opener body and a rearward end supporting the press wheel. The angle of the arm relative to the opener body is adjustable to vary the planting depth as desired for differing soil conditions and seed types. Presently available depth gauging systems include threaded and gear types, and pin and clip types wherein parts are first removed to readjust the angle and then are reinstalled after the gauging wheel is repositioned. The threaded and gear types require much time to adjust from one end of the range to the other end, and with use often become very hard to manipulate because of corrosion. Most pin and clip types require two hands to adjust and have loose parts which are easily lost and are time consuming to remove and reinstall. Some other types of depth adjustment devices often have more than one pivot point, have contact points which change with adjustments in depth setting and do not provide a uniform adjustment over the range of settings. Commonly, the gauge wheel arm must be physically moved by hand to make adjustments.

BRIEF SUMMARY OF THE INVENTION

It is therefore an object of the present invention to provide an improved depth gauging adjustment for an implement such as a grain drill. It is a further object to provide such an adjustment which overcomes the aforementioned problems.

It is another object of the present invention to provide an improved depth gauging adjustment which may be easily manipulated with one hand and does not require removal and reinstallation of parts. It is a further object to provide such an adjustment which is compact, simple in construction and reliable in operation.

It is still a further object of the present invention to provide an improved depth adjusting mechanism which is easily adjusted with simple motions and which provides uniform and predictable incremental depth adjustments. It is still another object to provide such a mechanism which does not require the gauge wheel arm to be moved during adjustment of the depth setting.

A depth gauging adjustment mechanism constructed in accordance with the teachings of the present invention includes a spring-loaded handle which pivots about a common axis with the depth gauging wheel arm on an opener assembly frame. The handle has two transversely located pins, and the back of the opener frame has notches on a radius struck on the axis for receiving the pins. The wheel arm and thus the planting depth are maintained by the handle.

Each handle position represents a different planting depth which can be adjusted easily with one hand by pulling the handle against the bias, repositioning the pins and then releasing the handle. Since there are no parts to remove and reinstall, adjustments may be made quickly without fear of losing parts. The use of a common axis for both the opener arm and the spring-loaded handle assure uniform and predictable incremental adjustments and simpler and more reliable operation. The gauge wheel arm swings freely downwardly below the handle when the assembly is raised to the transport position so that changes in the depth setting can be made easily without having to move the arm.

These and other objects, features and advantages of the present invention will become apparent to one skilled in the art upon reading the following detailed description in view of the drawings.

BRIEF DESCRIPTION OF THE DRAWINGS

FIG. 1 is a side view of an opener assembly including the depth gauging mechanism.

FIG. 2 is a top view of the rear portion of the opener assembly casting or body and showing the position of the gauge wheel arm relative to the body.

DETAILED DESCRIPTION OF THE DRAWINGS

Figure 3:
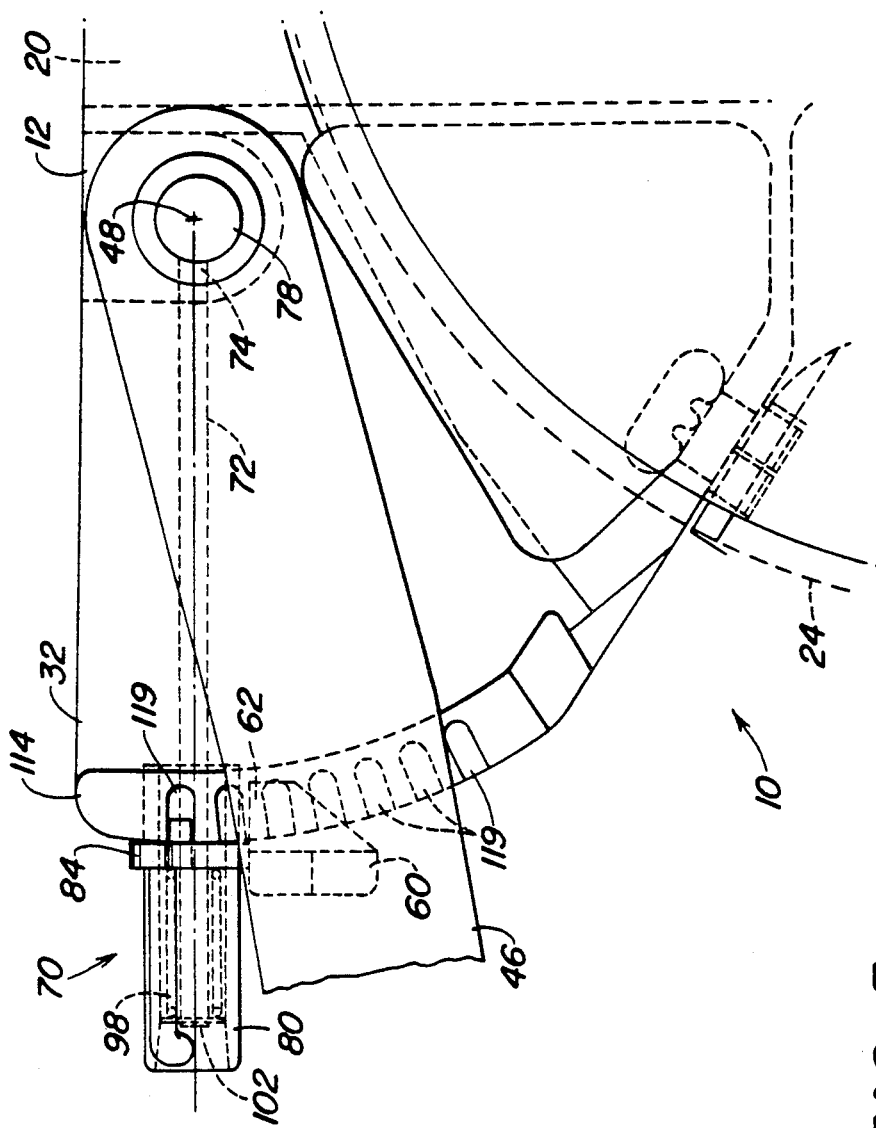
FIG. 3 is an enlarged side view of a portion of the assembly of FIG. 1 and showing the details of the depth gauging mechanism.

Referring now to FIG. 1, therein is shown an opener assembly 10 having a main body or casting 12 supported for forward movement at the aft end of a drawbar 14. The forward end of a drawbar 14 is connected to the frame of a seeding implement (not shown) such as a grain drill, and the drawbar is moveable vertically in a conventional manner to move the assembly 10 between a raised transport position and a lowered ground engaging position.

The central portion of the body 12 includes seed and fertilizer passages 18 and 20 and a lower disk blade support area 22 rotatably mounting a pair of angled disk blade openers 24 on opposite sides of the passages. The aft end 32 of the body 12 is bifurcated (FIGS. 2 and 4) to define a vertically extending and rearwardly opening central space 34.

Figure 4:
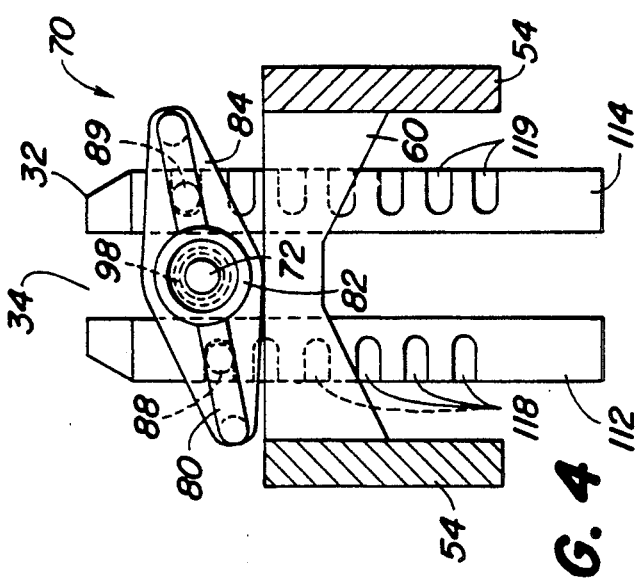
FIG. 4 is a rear view, partially in section, of the depth gauging mechanism of FIG. 3.

A trailing press wheel or gauge wheel 44 is rotatably supported at the aft end of a gauge wheel arm 46 for maintaining a preselected planting depth and for firming the soil over the material deposited in the furrow. The forward end of the gauge wheel arm 46 is pivotally connected to the bifurcated end 32 rearwardly adjacent the passage 18 for rocking about a transverse axis 48 above the opener disks 24. As best seen in FIGS. 1 and 4, the arm 46 includes forward sidelegs 54 which extend forwardly from the pivot 48 on either side of the bifurcated end 32. A wheel support portion 56 is welded to the aft ends of the sidelegs 54 and extends outwardly and rearwardly therefrom to a wheel mounting end 58. A cross member 60 is welded between the sidelegs 54 rearwardly adjacent the aft edges of the bifurcated portion 32 and includes a projection 62 which extends forwardly into the space 34 between the sides of the portion 32 to act as an abutment, as will be described more fully below. The projection 62 traverses an arc-shaped path with a radius centered on the pivot axis 48 as the arm 46 rocks vertically.

A depth adjustment handle assembly indicated generally at 70 is pivotally connected to the body 12 for rocking about the axis 48. The assembly 70 includes a rod 72 with a forward eye-end 74 pivotally connected to a bolt or pin 78 which supports the gauge wheel arm 46. The eye-end 74 is contained between the sides of the bifurcated end 32, and the rod 72 extends rearwardly therefrom between the sides and terminates in an aft end located radially outwardly of the rear edges of the bifurcated end and above the cross member 60.

A spring-biased handle 80 includes a central cylindrical member 82 (FIG. 5) welded to a forward plate 84 with rod-like hand grip portions 86 extending outwardly and forwardly from the aft end of the member 82 to connections with the outer ends of the plate 84. Transversely spaced pins 88 and 89 project forwardly from the plate 84. The plate 84 includes a centrally located aperture 92 for slidably receiving the aft end of the rod 72 therethrough. The aft end of the rod 72 projects into a cylindrical bore 96 in the member 82. A spring 98 is compressed between the aft face of the plate 84 and a washer and snap ring retainer 102 secured to the end of the rod 72. Pulling outwardly on the hand grip portions 86 causes the handle 80 to slide rearwardly on the rod 72 against the bias of the spring 98; thereafter upon releasing the grip portions, the handle 80 slides radially inwardly under the influence of the spring 98.

The rear edges of the bifurcated end 32 include peripheral portions 112 and 114 with pin-receiving notches 118 and 119 lying generally along the arc of a circle centered on the axis 48 for selectively receiving the pins 88 and 89, respectively, to secure the handle 80 in one of a plurality of positions along the arc. The notches 118 and 119 are staggered relative to each other (FIG. 4) to increase the number of increments through which the handle 80 may be adjusted.

With the pins 88 and 89 of the handle 80 secured in a pair of notches 118 and 119, the plate 84 is positioned in the path of the member 60 and projection 62. As the opener assembly is moved downwardly into engagement with the soil, the gauge wheel arm 46 rocks upwardly from the lowermost position (that is, the position shown by the solid lines in FIG. 1) to the a position wherein the member 60 abuts the lower edge of the plate 84 on the handle 80 (FIG. 3), thereby establishing the general working depth of the opener.

To adjust the working depth, the opener assembly 10 is raised toward the transport position so that the gauge wheel arm 46 swings freely downwardly from its abutted position with the handle 80. The operator then grips the handle 80 with one hand and pulls the handle outwardly against the bias of the spring 98 to release the pins 88 and 89 from the slots 118 and 119. The handle 80 then is pivoted about the axis 48 to the angular position corresponding to the wheel arm adjustment for the desired operating depth of opener. The operator releases the handle 80, and the spring 98 biases the pins 88 and 89 into a set of notches 118 and 119 to hold the plate 84 firmly in position above the arm 46 in the path of the member 60. Upon movement of the opener assembly 10 to the soil-engaging position, the wheel 44 contacts the ground and rocks the arm 46 upwardly until the member 60 abuts the plate 84.

Figure 5:
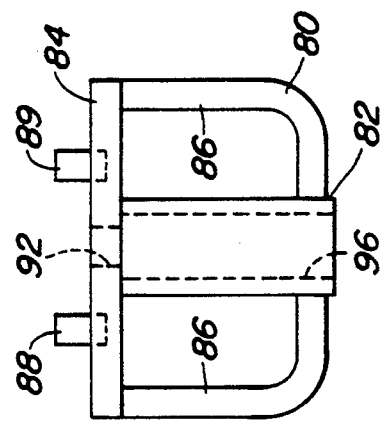
FIG. 5 is a top view of the hand grip portion of the gauging mechanism.

As best seen in FIGS. 4 and 5, the member 60 and the handle 80 are constrained for rocking about the same axis 48, and the notches 118 and 119 generally lie on an arc of a circle centered on the axis 48 so that the forces acting on the pins 88 and 89 are at right angles to the axes of the pins and the notches so there is little or no axial forces acting to move the pins either in or out of the notches. The configuration also provides uniform and predictable adjustment increments over the range of depth adjustment. The arrangement also provides free swinging of the gauge wheel arm 46 below the depth adjustment handle assembly 40 so that position of the handle 80 can be changed easily with one hand, without having to move the arm 46, when the assembly is raised to the transport position.

Having described the preferred embodiment, it will become apparent that various modifications can be made without departing from the scope of the invention as defined in the accompanying claims.

We claim:

1. In a furrow opener assembly having an opener body, an adjustable depth furrow opener and a gauge wheel for adjusting the depth of the opener, the opener movable vertically between an upper transport position and a lower field-working position, an adjustment mechanism comprising a fore-and-aft extending gauge wheel arm supporting the gauge wheel and including an abutment portion, means for pivotally connecting the wheel arm to the body for rocking with respect to the opener about an arm axis with the abutment portion located radially outwardly of the arm axis and moving through an arc-shaped path as the wheel arm rocks, an adjustable stop member comprising a handle member extending radially outwardly from the arm axis and connected to the body for rocking in an arc about the arm axis, having a portion lying in the arc-shaped path in interfering relation with the abutment portion for limiting upward rocking of the wheel arm to a preselected rocked position dependent on the rocked position of the handle member, means for releasably securing the stop member in one of a plurality of selectable positions for maintaining a preselected opener depth of operation, wherein the wheel arm is freely rockable downwardly from the stop member when the assembly is in the transport position.

2. The invention as set forth in claim 1 wherein the body includes a notched portion lying generally on an arc centered on the arm axis, and the handle member includes radially moveable pin structure selectively engageable with the notched portion.

3. The invention as set forth in claim 1 wherein the body includes an aft bifurcated portion, the wheel arm includes sidelegs extending outwardly on either side of the bifurcated portion, and the handle member includes a portion projecting forwardly between the bifurcated portion.

4. The invention as set forth in claim 3 further including a rod pivotally connected to the body for rocking about the arm axis and means for slidably mounting the handle member on the end of the rod.

5. In a furrow opener assembly having an opener body, an adjustable depth furrow opener and a gauge wheel for adjusting the depth of the opener, the opener movable vertically between an upper transport position and a lower field-working position, an adjustment mechanism comprising a fore-and-aft extending gauge wheel arm supporting the gauge wheel, means for pivotally connecting the wheel arm to the body for rocking with respect to the opener about an arm axis, a stop member located radially outwardly of the arm axis and moveable through an arc-shaped path centered on the arm axis for limiting upward rocking of the wheel arm to a preselected rocked position, the body including a notched portion located generally on the arc of a circle with radius centered on the arm axis, means for releasably securing the stop member in the notched portion in one of a plurality of selectable positions for maintaining a preselected opener depth of operation, and wherein the wheel arm is freely rockable downwardly from the stop member when the assembly is in the transport position.

6. The invention as set forth in claim 5 wherein the stop member comprises a handle member connected to the body for rocking in an arc about the arm axis.

7. The invention as set forth in claim 6 wherein the handle member includes radially moveable pin structure selectively engageable with the notched portion.

8. The invention as set forth in claim 5 including a rod connected to the wheel arm pivot, wherein the handle is slidable radially on the rod.

* * * * *